United States Patent
Bunn et al.

(10) Patent No.: US 7,025,868 B2
(45) Date of Patent: **\*Apr. 11, 2006**

(54) METHODS AND APPARATUS FOR SIMULTANEOUS CHLORINE AND ALKALINE-PEROXIDE PRODUCTION

(75) Inventors: Thomas L. Bunn, Simi Valley, CA (US); Alan Zachary Ullman, Northridge, CA (US)

(73) Assignee: The Boeing Company, Chicago, IL (US)

(\*) Notice: Subject to any disclaimer, the term of this patent is extended or adjusted under 35 U.S.C. 154(b) by 51 days.

This patent is subject to a terminal disclaimer.

(21) Appl. No.: 10/338,648

(22) Filed: Jan. 7, 2003

(65) Prior Publication Data

US 2004/0129577 A1 Jul. 8, 2004

(51) Int. Cl.
*C25B 1/30* (2006.01)
*C25D 17/00* (2006.01)

(52) U.S. Cl. ............ 205/466; 205/618; 204/252; 204/263; 204/265; 204/266

(58) Field of Classification Search ............ 205/466, 205/618; 204/252, 263, 265, 266
See application file for complete search history.

(56) References Cited

U.S. PATENT DOCUMENTS

| | | | |
|---|---|---|---|
| 2,000,815 A | 5/1935 | Berl | |
| 3,989,201 A | 11/1976 | Oloman et al. | |
| 4,118,305 A | 10/1978 | Oloman et al. | |
| 4,357,217 A | 11/1982 | Kuehn et al. | |
| 4,384,931 A | 5/1983 | Jasinski et al. | |
| 4,406,758 A | 9/1983 | McIntyre et al. | |
| 4,430,176 A | 2/1984 | Davison | |
| 4,445,986 A | 5/1984 | McIntyre et al. | |
| 4,457,953 A | 7/1984 | McIntyre et al. | |
| 4,511,441 A | 4/1985 | McIntyre et al. | |
| 4,891,107 A | 1/1990 | Dong et al. | |
| 4,921,587 A | 5/1990 | Dong et al. | |
| 4,927,509 A | 5/1990 | Mathur et al. | |
| 5,565,073 A | 10/1996 | Fraser et al. | |
| 5,647,968 A | 7/1997 | Fraser et al. | |
| 5,693,267 A | 12/1997 | Beshore et al. | |
| 5,702,585 A | 12/1997 | Hillrichs et al. | |
| 5,735,469 A | 4/1998 | Rodriguez et al. | |
| 5,837,206 A | 11/1998 | Traffenstedt et al. | |
| 5,907,573 A | 5/1999 | Ullman et al. | |
| 6,004,449 A \* | 12/1999 | Vetrovec | 205/466 |
| 6,154,478 A | 11/2000 | Vetrovec | |
| 6,159,349 A | 12/2000 | Wakita et al. | |
| 6,322,690 B1 \* | 11/2001 | Hammer-Olsen et al. | 205/466 |
| 6,339,805 B1 | 1/2002 | Vetrovec | |
| 6,366,594 B1 | 4/2002 | Bauer et al. | |
| 6,553,064 B1 | 4/2003 | Bauer et al. | |
| 6,562,225 B1 \* | 5/2003 | Vetrovec | 205/466 |
| 6,603,793 B1 | 8/2003 | Vetrovec | |

(Continued)

*Primary Examiner*—Arun S. Phasge
(74) *Attorney, Agent, or Firm*—Ingrassia Fisher & Lorenz, P.C.

(57) ABSTRACT

An electrolytic cell for producing chlorine and basic hydrogen peroxide suitably includes an anode partition and a cathode partition separated by a membrane. The cathode partition is divided into a catholyte compartment and a gas plenum by a gas diffusion cathode. The anode partition electrolyzes alkali chloride received from the laser to produce free chlorine and alkali ions. The catholyte partition reduces oxygen received from the gas plenum through the cathode, and produces alkaline peroxide from the oxidized components combined with alkali ions received through the membrane from the anode partition. The cell is particularly useful in a fuel regeneration system (FRS) for a chemical oxygen iodine laser (COIL).

14 Claims, 2 Drawing Sheets

U.S. PATENT DOCUMENTS

| | | |
|---|---|---|
| 6,621,848 B1 | 9/2003 | Ullman et al. |
| 6,625,193 B1 | 9/2003 | Vetrovec |
| 6,650,681 B1 | 11/2003 | Ullman et al. |
| 6,674,781 B1 | 1/2004 | Dickerson et al. |
| 6,687,279 B1 | 2/2004 | Ullman et al. |
| 6,688,077 B1 | 2/2004 | Rice et al. |
| 6,714,579 B1 | 3/2004 | Ullman et al. |
| 6,763,051 B1 | 7/2004 | Bunn et al. |
| 6,778,328 B1 | 8/2004 | Rice et al. |
| 6,810,060 B1 | 10/2004 | Vetrovec |
| 2003/0198264 A1 | 10/2003 | Vetrovec et al. |
| 2003/0213701 A1 | 11/2003 | Arndlesen et al. |
| 2004/0126849 A1 | 7/2004 | Ullman et al. |
| 2004/0179572 A1 | 9/2004 | Bunn et al. |
| 2004/0179990 A1 | 9/2004 | Bunn et al. |

* cited by examiner

METHODS AND APPARATUS FOR SIMULTANEOUS CHLORINE AND ALKALINE-PEROXIDE PRODUCTION

U.S. GOVERNMENT RIGHTS

This invention was made with Government support under contract number DASG60-00-C-0079 awarded by the U.S. Army. The Government has certain rights in this invention.

FIELD OF THE INVENTION

The present invention generally relates to electrochemical systems, and more particularly to electrochemical systems for producing chlorine and alkaline peroxide. Such systems are frequently used in conjunction with chemical oxygen iodine lasers.

BACKGROUND OF THE INVENTION

High energy lasers (HELs) are becoming increasingly used in military applications as well as in industrial settings. HELs are commonly used in industrial processes, for example, to cut metals and other substances. When used as weapons, HELs are particularly useful in precision strike (PS) situations where it is desirable to minimize collateral damage. HELs have also been mounted on spacecraft, aircraft, ships and land-based vehicles for other military-related purposes, including missile defense.

One type of laser that is commonly used in military and industrial applications is the chemical oxygen iodine laser (COIL), which is typically a medium-power laser with a power on the order of about 100–200 kW. COIL lasers are typically fueled by reacting aqueous basic and hydrogen peroxide solution (BHP) with chlorine gas to form singlet delta oxygen ($O_2(^1\Delta)$) or singlet molecular oxygen. For a laser using potassium as an alkali metal, the laser operates according to the following reaction:

$$2KOH+H_2O_2+Cl_2 \rightarrow 2KCl+2H_2O+O_2(^1\Delta) \qquad (1)$$

This excited state oxygen flows into a nozzle of the COIL laser where it reacts with iodine to form an excited state of the iodine atom, I*, which in turn acts as a gain medium to produce stimulated photon emissions and coherent light with a wavelength of about 1.315 μm. This emitted light can be focused and directed to produce the laser beam. By-products of the lasing process typically include oxygen and a brine solution of alkali chloride or halide (e.g. KCl, NaCl, LiCl or the like), as shown above in Equation 1.

Although COIL lasers are quite effective in battlefield situations, transportation and handling of the laser fuel chemicals can present logistics issues, particularly if the laser is mobile or stationed in a remote location (e.g. in space). To address these issues, many modern COILs include fuel regeneration systems (FRS) that effectively reprocess the laser byproducts into fuel that can be reused in subsequent laser operation. Typically, fluid regeneration systems include three separate processing cells, as shown in FIG. 1. As shown therein, a conventional FRS typically includes a chlor-alkali ("CA") cell that electrolyzes salt received from the laser to produce a hydroxide, hydrogen and free chlorine as follows:

$$2KCl+2H_2O \rightarrow 2KOH+Cl_2+H_2 \qquad (2)$$

The hydroxide formed at the CA cell is typically provided to an alkaline-peroxide ("AP") cell that oxidizes water to produce BHP as follows:

$$2KOH+H_2O+\tfrac{1}{2}O_2 \rightarrow H_2O_2+2KOH \qquad (3A)$$

Hydrogen obtained from the CA cell may be combined with oxygen in a fuel cell to form water, which is much less volatile than free hydrogen in accordance with the reaction:

$$H_2+\tfrac{1}{2}O_2 \rightarrow H_2O \qquad (3B)$$

When the process is complete, chlorine from the CA cell and BHP from the AP cell are provided to the laser for further consumption. The complete stoichemistry for this process is:

$$2KCl+2H_2O+O_2 \rightarrow 2KOH+H_2O_2+Cl_2 \qquad (4)$$

which is the inverse of Equation 1 above, except that the oxygen in Equation 4 can be in any electronic state. Accordingly, adding the mixture of two moles of alkali hydroxide and one mole of hydrogen peroxide (i.e. alkaline peroxide) to BHP that had been used in lasing restores the BHP to its original stoichiometry.

Although the use of a FRS does improve the battlefield logistics of operating a COIL, the three-cell nature of the FRS requires a relatively large amount of electrical energy to support the three separate reactions. Several attempts have been made to combine the various cells, but performance issues remain with many of these systems. U.S. Pat. No. 6,004,449 issued to Vetrovec on Dec. 21, 1999, for example, describes an electrolytic cell that includes a trickle bed cathode and a diaphragm for controlling liquid flow throughout the cell. Although this system contains fewer cells than most conventional FRS's, the system exhibits various manufacturability and performance issues relating to complexities of the trickle-bed cathode.

It therefore remains desirable to create a fuel regeneration system that improves the efficiency of the regeneration process. In addition, it is desirable to reduce or eliminate the need for one or more cells in the FRS to reduce the complexity of the system. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

According to various exemplary embodiments, an electrolytic cell for producing chlorine and basic hydrogen peroxide suitably includes an anode partition and a cathode partition separated by a membrane. The cathode partition is divided into a catholyte compartment and a gas plenum by a gas diffusion cathode. The anode partition electrolyzes an alkali chloride solution received from the laser to produce free chlorine and alkali ions. The catholyte partition reduces oxygen received from the gas plenum through the cathode, and produces an alkaline peroxide solution from the oxidized components combined with alkali ions received through the membrane from the anode partition. Other exemplary embodiments of the invention relate to laser systems, fuel replacement systems and associated methods for replenishing fuels consumed by a chemical laser.

BRIEF DESCRIPTION OF THE DRAWINGS

The present invention will hereinafter be described in conjunction with the following drawing figures, wherein like numerals denote like elements.

DETAILED DESCRIPTION OF EXEMPLARY EMBODIMENTS

The following detailed description of the invention is merely exemplary in nature and is not intended to limit the invention or the application and uses of the invention. Furthermore, there is no intention to be bound by any theory presented in the preceding background of the invention or the following detailed description of the invention.

According to various embodiments, a single electrochemical cell is provided to replace the conventional CA, AP and fuel cells. The electrochemical cell suitably includes a cathode partition and an anode partition, with each partition containing a portion of the chemical regeneration process. Chlorine is obtained by electrolyzing the alkali salt received from the laser. The electrolysis also frees alkali metal ions, which appropriately pass though a membrane to the cathode to form alkaline peroxide in the cathode partition. In a further embodiment, the cathode is a gas diffusion cathode that separates the cathode partition into a catholyte (i.e. liquid) section and a gas plenum. Oxygen and/or air circulating in the plenum is allowed to diffuse through the cathode to reach the reducing process occurring on the catholyte side of the cathode partition. Both chlorine and alkaline peroxide are appropriately recovered from the laser byproducts in a single cell, thus allowing continued operation of the laser without the need for external fuel replenishment.

Figure 1:
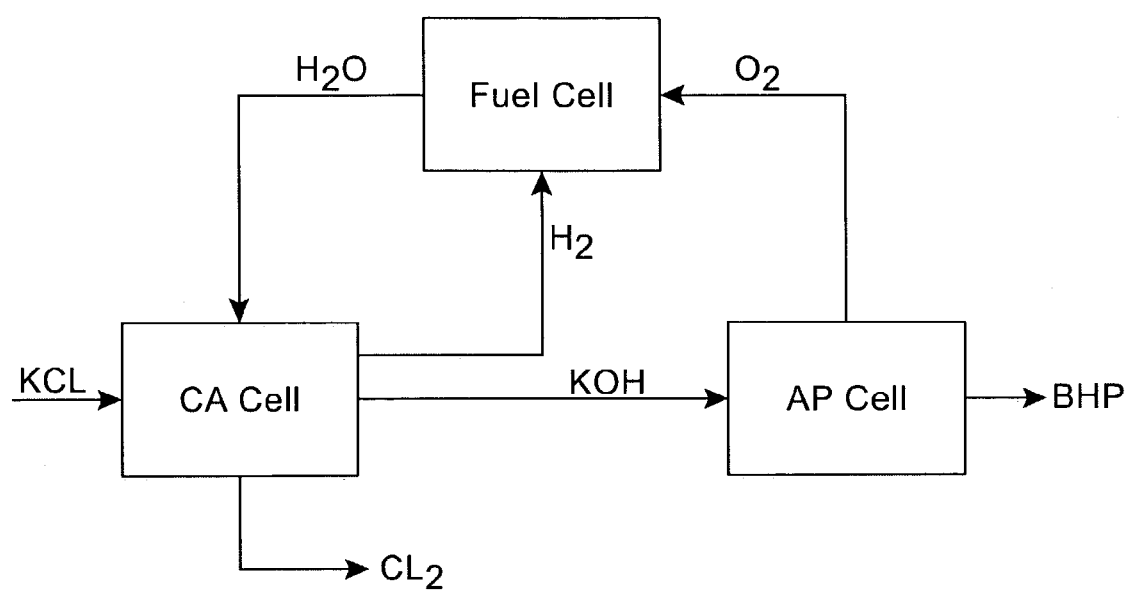
FIG. 1 is a block diagram of a prior art fuel regeneration system for a chemical oxygen iodine laser.
Figure 2:
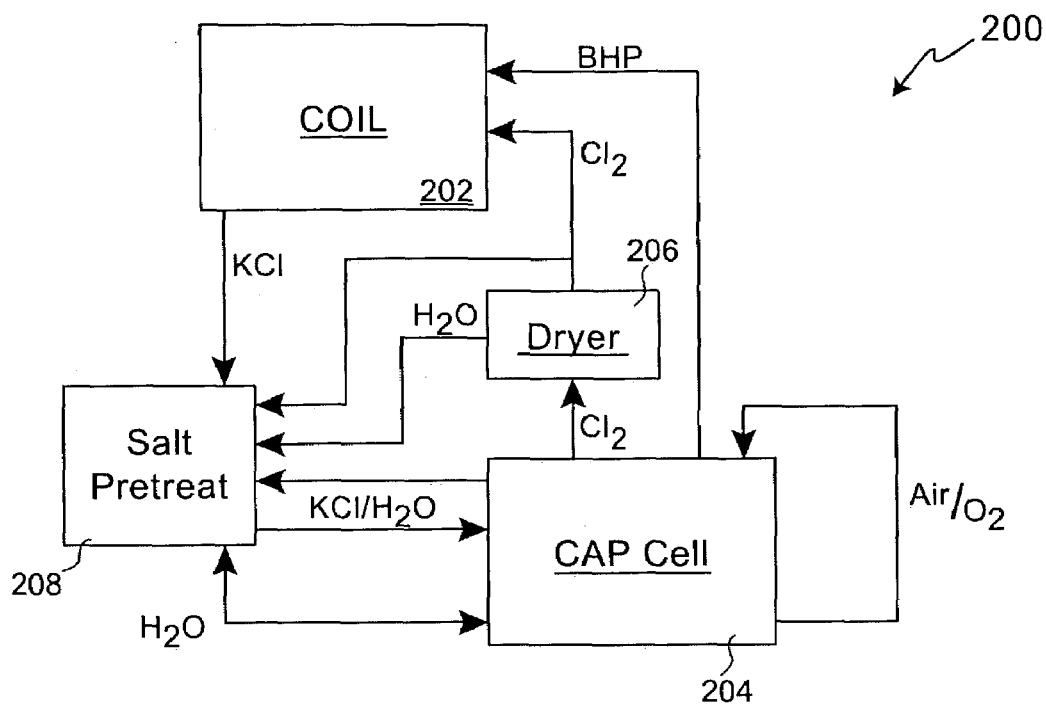
FIG. 2 is a block diagram of an exemplary improved fuel regeneration system for a chemical oxygen iodine laser.

Referring now to FIG. 2, an exemplary fuel regeneration system (FRS) 200 for a chemical oxygen iodine laser (COIL) 202 suitably includes a hybrid electrolytic cell 204, a salt pre-treatment module 208 and a dryer 206. FRS 200 suitably receives alkaline salts or other spent fuels from laser 202, processes the spent fuels to create usable fuel products such as chlorine and basic hydrogen peroxide (BHP), and provides the rejuvenated fuels to laser 202 as appropriate. Although external sources of additional water, air and/or oxygen may be provided in some embodiments, many embodiments of FRS 200 provide self-contained systems that require only electrical power to restore fuel to laser 202, thus reducing the need for logistics support in battlefield, space or other inconvenient locations.

Electrolytic cell 204 is any cell, module or other enclosure that is capable of supporting the various chemical reactions to regenerate fuels for laser 202 as described, for example, in Equation 4 above. In various embodiments, electrolytic cell 204 is a chlor-alkaline peroxide (CAP) cell that incorporates the anode functionality of a chlor-alkali (CA) cell with the oxygen cathode functionality of an alkaline-peroxide (AP) cell, as described in greater detail below. Water and/or recirculated air or oxygen may also be provided from an external source, as appropriate. Because the reactions previously supported by separate AP, CA and fuel cells are combined into a single electrolytic cell 204, the overall energy and chemical efficiencies of FRS 200 are greatly improved. Moreover, the size, weight and mechanical complexity of FRS 200 is reduced by eliminating the connecting pipes, pumps, strippers, tanks and/or other plumbing previously required to interconnect the various electrochemical cells. Further, as will be appreciated below, in many embodiments the single electrolytic cell design eliminates the need to process free hydrogen, thus removing the need for a fuel cell and other hydrogen-processing equipment (e.g. a hydrogen stripper) while improving the safety of the system. Accordingly, various embodiments of FRS 200 are suitably lighter, less expensive, more efficient, safer and simpler to operate and maintain than corresponding fuel replacement systems with multiple electrochemical cells.

Salt pre-treatment module 208 is any tank, chamber or other vessel capable of receiving the brine solution from laser 202 and of reducing the level of contaminants in the solution before the salt arrives at electrolytic cell 204. In one embodiment, contaminants such as hydrogen peroxide, other peroxides and the like are reacted away from the solution by exposing the salt to chlorine under acid conditions. Pre-treatment module 208 may further include a pump, actuator or other device to improve the flow of salt from laser 202 to electrolytic cell 204. Pre-treatment may not be required in all embodiments; in such cases, brine solution containing alkali chloride may be provided from laser 202 directly to electrolytic cell 204.

Dryer module 206 is any chiller, condenser or other drying device capable of removing water vapor from the gaseous chlorine emanating from electrolytic cell 204. Dryer 206 may also cool the gaseous chlorine, which may have a temperature on the order of about 90° C. when emerging from electrolytic cell 204. Water vapor removed from the chlorine may be provided to salt pretreatment module 208, to electrolytic cell 204 or to any other appropriate destination.

In operation, FRS 200 suitably receives alkali salts such as potassium chloride (KCl), sodium chloride (NaCl), lithium chloride (LiCl) or the like in brine solution form from laser 202 or another source and provides the solution to pretreatment module 208. Salt pretreatment module 208 suitably removes contaminants from the salt, which is then provided to electrolytic cell 204 for further processing. Electrolytic cell 204 appropriately provides an electric potential between an anode and a cathode in contact with an aqueous solution containing the salt to produce alkali ions and free chlorine at the anode. The alkali ions pass through a membrane to the oxidizing cathode portion of electrolytic cell 204 to form alkaline peroxide solution (AP) that can be combined with spent BHP from a previous laser fire to produce fuel for the next firing of laser 202. The free chlorine is collected at dryer 206, which appropriately removes water vapor before the chlorine is provided as fuel to laser 202. Additional detail about the chemical processes occurring within FRS 200 is presented below.

Figure 3:
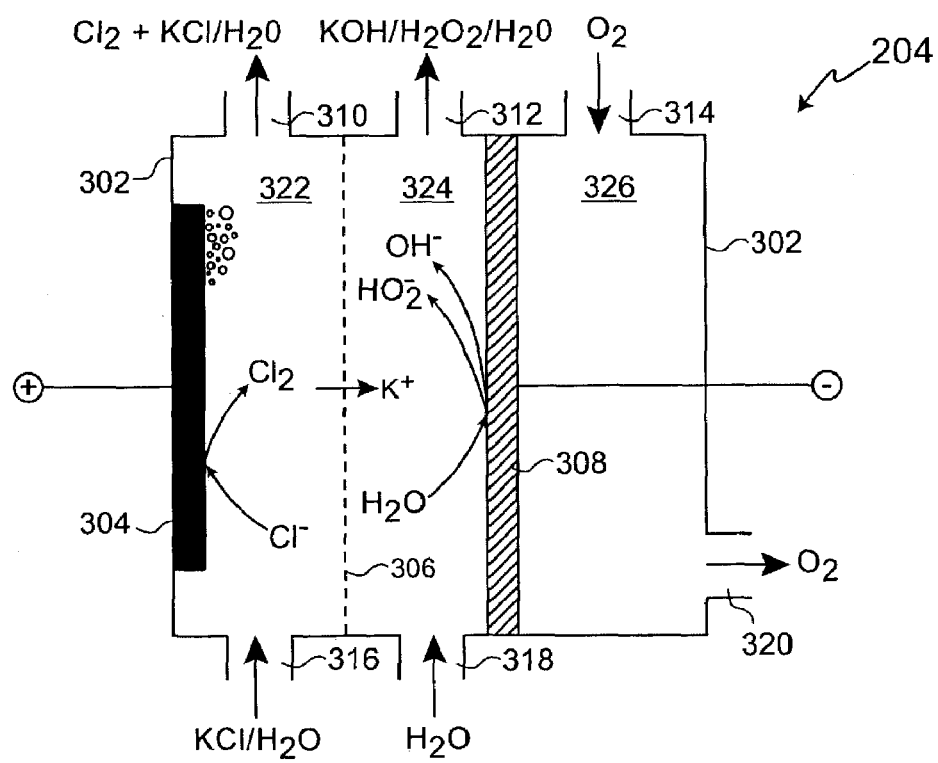
FIG. 3 is a schematic of an exemplary chlor-alkaline peroxide (CAP) cell suitable for use with a fuel regeneration system for a chemical oxygen iodine laser.

With reference now to FIG. 3, an exemplary single-chamber electrolytic cell 204 suitably includes an anode partition 322 and a cathode partition that includes a catholyte compartment 324 and a gas plenum 326 separated by a cathode 308. Alkali chloride received in anode partition 322 is appropriately electrolyzed at anode 304 to produce free chlorine and alkali ions, while oxygen is reduced at cathode 308 to produce base and hydrogen peroxide. The stoichiometric ratio of the base to peroxide may be on the order of 2:1, in which case the mixture is termed "alkaline peroxide" to differentiate from the basic hydrogen peroxide solution used as a laser fuel, which typically has a base-toperoxide stoichiometric ratio on the order of 1:1. The anode and cathode partitions are appropriately separated by a membrane 306 that allows alkali ions to pass from anode partition 322 to the catholyte partition 324 while suppressing movement of hydroxide ions in the opposite direction.

Chemical reactions within electrolytic cell 204 suitably take place within a single chamber formed within a housing 302. Housing 302 is any material or combination of materials that is chemically inert, resistive to acidic and basic solutions, and that has a low coefficient of conductivity. Exemplary materials used in various embodiments of housing 302 include any type of plastic, ceramic or glass. Housing 302 is appropriately molded or otherwise formed to enclose the single chamber and to incorporate various inlets and outlets as described below. Electrolytic cells useful in various embodiments are widely used in various industrial and metallurgical processes, and are readily available from multiple commercial sources. Exemplary cells such as the model FM15000 cell are available from the ICI Group of London, England and others.

Anode partition 322 suitably includes an inlet 316, an outlet 310 and an anode electrode 304. Alkali chloride in aqueous solution is received through inlet 316 and electrolyzed at anode 304 to produce free chlorine gas as follows:

$$2KCl \rightarrow 2K^+ + Cl_2 + 2e^- \qquad (5)$$

The free chlorine gas bubbles toward outlet 310, which leads to dryer 206 or to laser 202 (FIG. 2). As briefly mentioned above, the chlorine gas may be relatively hot (e.g. on the order of 90° C.), and may contain water vapor and/or other impurities when exiting electrolytic cell 204. Additionally, excess alkali chloride solution may be present in outlet 310, which can be recirculated to inlet 316 as appropriate.

Anode 304 is formed from any conducting material that is relatively inert and stable to corrosion such as titanium, aluminum or another metal. In an exemplary embodiment, anode 304 is a dimensionally stable anode formed of titanium with a ruthenium oxide coating (Ti/RuO$_2$), such as the DSA anodes available from Diamond Shamrock Technologies, S.A., of Geneva, Switzerland. Such an anode is a good catalyst for chlorine, having an overpotential on the order of about 50 millivolts, while having a much higher overpotential for oxygen, thus resulting in a relatively low amount of oxygen in the product stream.

Membrane 306 separates anode partition 322 from catholyte compartment 324 while allowing alkali metal ions (e.g. K$^+$ or Na$^+$) and other cations (e.g. H$^+$ derived from electrolyzed water) to pass from anode 304 to cathode 308. Membrane 306 may be implemented as any cation exchange material that has a low electrical resistance, that is stable to wet chlorine and other highly caustic solutions, and that allows alkali ions to pass while resisting hydroxide ion back migration from catholyte to anolyte. One example of such a membrane is a perflourinated sulfonic acid polymer that may be laminated or otherwise affixed to a carboxylate polymer. Suitable membranes are available from various commercial sources, including W.L Gore and Associates Inc. of Newark, Del., the DuPont Corporation and others.

The cathode partition suitably includes both a catholyte compartment 324 and gas plenum 326 separated by cathode 308. Oxygen that diffuses through cathode 308 is appropriately reduced at cathode 308 to produce hydroxide and peroxide ions as follows:

$$H_2O + O_2 + 2e^- \rightarrow O_2H^- + OH^- \qquad (6)$$

The ions produced by the oxidation process suitably combine with alkali ions that have passed through membrane 306 to produce base and hydrogen peroxide (BHP):

$$O_2H^- + OH^- + 2K^+ + H_2O \rightarrow 2KOH + H_2O_2 \qquad (7)$$

The AP solution combined with the spent BHP from the previous laser fire is provided to laser 202 (FIG. 2) via output 312 in catholyte compartment 324.

Cathode 308 is any electrically conductive material capable of defining catholyte compartment 324 and gas plenum 326 within housing 302. Although gases such as oxygen and/or air may be allowed to permeate cathode 308 from plenum 326 to catholyte compartment 324, liquids in catholyte compartment 324 are prevented from entering plenum 326 through cathode 308. In an exemplary embodiment, cathode 308 is a gas diffusion cathode (GDC) that allows oxygen to pass through a porous yet hydrophobic material such as a carbon cloth. The carbon material may be coated with a layer of high surface area sintered carbon and/or a fluorocarbon bonding such as the TEFLON coating available from the DuPont Corporation of Wilmington, Del. Suitable gas diffusion cathodes may be obtained from various suppliers such as the E-Tek Corporation of Somerset, N.J.

Gas plenum 326 is any region within housing 302 adjacent to cathode 308 that is capable of maintaining a steady flow of gas such as air or oxygen. Plenum 326 suitably includes an inlet 314 and an outlet 320 whereby the gas is circulated and/or replenished as appropriate. In various embodiments, gas in plenum 326 is replenished with air via inlet 314, or with oxygen extracted from the surrounding air. As described above, oxygen diffuses through cathode 308 during the oxidation process to produce BHP in catholyte compartment 324.

In operation, then, electrolytic cell 204 receives aqueous alkaline salt (e.g. KCl) at an inlet 316 to anode partition 322, water at an input 318 to catholyte compartment 324 and air or oxygen at a gas input 314 to plenum 326. As an electric potential is applied between anode 304 and cathode 308, alkaline salt and water are electrolyzed at anode 304 to produce alkali ions, hydrogen ions, and free chlorine. The free chlorine bubbles to an outlet 310, where it is collected and ultimately passed to laser 202 (FIG. 2) as fuel. Alkali ions pass through membrane 306 to catholyte compartment 324, where oxygen is reduced at cathode 308 to produce hydroxide and peroxide ions. The ions produced at cathode 308 suitably combine with the alkali and hydrogen ions in catholyte compartment 324 to produce alkali hydroxide, hydrogen peroxide and water, collectively referred to as alkaline peroxide (AP) that is collected at outlet 312 and ultimately provided as fuel to laser 202 (FIG. 2). Oxygen for the reduction process diffuses from plenum 326 through cathode 308 to catholyte compartment 324, as appropriate.

Exemplary reactions carried out within electrolytic cell 204 may have a threshold cell potential on the order of about 1.44 volts when potassium is the alkali metal used in the process. The overall stoichiometry for the processes carried out by electrolytic cell 304 when the alkali metal is potassium is:

$$2KCl + 2H_2O + O_2 \rightarrow 2KOH + H_2O_2 + Cl_2 \qquad (8)$$

which is chemically identical to Equation 4 above. Of course other alkali metals such as sodium, lithium and the like could be used in place of or in addition to potassium.

Accordingly, the three process cells previously required have been replaced by a single cell that is able to produce each of the fuel components consumed by a COIL laser (e.g. chlorine and BHP). By producing each of the components in a single electrolytic cell 204, improved chemical, energy and mechanical efficiencies result.

While at least one exemplary embodiment has been presented in the foregoing detailed description of the invention, it should be appreciated that a vast number of equivalent variations exist. For example, although the techniques and devices have been primarily described in conjunction with chemical oxygen ion lasers fueled with chlorine and potassium hydroxide, the invention is not so limited. Equivalent embodiments may process different alkali metals such as lithium, sodium or the like (as well as combinations of those metals), and may result in one or more different but equivalent products such as sodium hydroxide, lithium hydroxide, fluorine gas, bromine gas or the like. Further, the electrochemistry described herein could apply to various industrial processes that are equivalent to the COIL laser applications described herein. Moreover, the steps of the various chemical processes described herein may be practiced simultaneously, or in any temporal or spatial order. As such, the exemplary embodiments presented herein are intended as examples, and are not intended to limit the scope, applicability, or configuration of the invention in any way. Rather, the foregoing detailed description provides a convenient road map for implementing exemplary embodiments of the invention. Various changes may be made in the function and arrangement of steps or elements described in any of the exemplary embodiments without departing from the scope of the invention as set forth in the appended claims and their legal equivalents.

What is claimed is:

1. A system comprising a chemical oxygen iodine laser, where the system produces chlorine and alkaline peroxide for the chemical oxygen iodine laser that produces an alkali salt, the system comprising an electrolytic cell and a pre-treatment chamber configured to treat the alkali salt with chlorine to produce an alkali chloride, wherein the electrolytic cell comprises:
    an anode partition having an inlet configured to receive an aqueous solution of the alkali chloride, an anode configured to electrolyze the alkali chloride to produce chlorine and alkali ions, and an output configured to provide the chlorine;
    a cathode partition comprising a catholyte compartment and a gas plenum separated by a gas diffusion cathode, wherein the cathode is configured to reduce oxygen received from the gas plenum through the cathode in the catholyte compartment, and wherein the gas plenum is configured to re-circulate oxygen; and
    a cation exchange membrane separating the anode partition from the cathode partition, wherein the membrane is configured to allow the alkali ions to pass from the anode partition to the cathode partition to form alkaline peroxide in the cathode partition.

2. The system of claim 1 wherein the anode is a dimensionally stable anode.

3. The system of claim 2 wherein the anode comprises titanium and a ruthenium oxide coating.

4. The system of claim 3 wherein the cathode comprises a hydrophobic carbon-based material.

5. A laser system comprising:
    a chemical laser configured to consume chlorine and basic hydrogen peroxide and to produce an alkali salt;
    a chlor alkaline peroxide (CAP) cell comprising an anode chamber and a cathode chamber, wherein the CAP cell is configured to electrolyze the alkali salt to produce chlorine and alkali ions in the anode chamber, to allow the alkali ions to pass through a membrane separating the anode chamber and the cathode chamber, and to reduce oxygen in the cathode chamber in the presence of the alkali ions to produce alkaline peroxide; and
    a salt pre-treatment chamber configured to receive the alkali salt from the laser, to treat the alkali salt with chlorine, and to provide treated alkali salt to the chlor alkaline peroxide cell.

6. The laser system of claim 5 wherein the cathode chamber comprises a catholyte compartment and a gas plenum separated by a gas diffusion cathode.

7. The laser system of claim 6 wherein the gas plenum is configured to recirculate oxygen and to provide oxygen through the cathode to the catholyte compartment.

8. The laser system of claim 5 further comprising a dryer configured to receive a chlorine solution from the CAP cell, to remove water vapor from the chlorine solution, to provide the water vapor to the salt pre-treatment chamber, and to provide the chlorine to the laser.

9. A fuel regeneration system for a chemical oxygen iodine laser producing an alkali salt, the fuel regeneration system comprising a chlor alkaline peroxide (CAP) cell and a salt pre-treatment chamber configured to receive the alkali salt from the laser and to treat the alkali salt with chlorine to produce an alkali chloride, wherein the CAP cell comprises:
    an anode partition having an anode configured to electrolyze the alkali chloride to produce chlorine and alkali ions;
    a cathode partition comprising a catholyte compartment and a gas plenum separated by a cathode, wherein the cathode is configured to reduce oxygen received from the gas plenum through the cathode in the catholyte compartment; and
    a membrane separating the anode partition from the cathode partition, wherein the membrane is configured to allow the alkali ions to pass from the anode partition to the cathode partition to form alkaline peroxide in the cathode partition.

10. A system comprising a chemical oxygen iodine laser, where the system produces chlorine and alkaline peroxide for the chemical laser that produces a an alkali salt, the system comprising:
    means for treating the alkali salt produced by the laser with chlorine to produce an alkali chloride;
    means for electrolyzing the alkali chloride to produce chlorine and alkali ions;
    means for reducing oxygen in a catholyte compartment of a cathode partition, wherein the reducing means receives oxygen from a gas plenum through a gas diffusion cathode separating the catholyte compartment and the gas plenum;
    means for separating the anode partition from the cathode partition while allowing the alkali ions to pass from the anode partition to the cathode partition to form basic hydrogen peroxide in the cathode partition.

11. The electrolytic cell of claim 10 wherein the wherein the inlet of the anode partition is coupled to a salt pre-treatment chamber configured to treat an alkali salt received from a chemical laser with chlorine received from the anode partition to form the alkali chloride.

12. A method of producing chlorine and alkaline peroxide fuels for a laser in an electrolytic cell, the method comprising the steps of:
    pre-treating an alkali salt produced by the laser with chlorine to produce an alkali chloride;

electrolyzing the alkali chloride in an anode chamber of the electrolytic cell to produce chlorine and alkali ions;

reducing oxygen in a catholyte compartment of the electrolytic cell; and separating the anode partition from the catholyte compartment while allowing the alkali ions to pass from the anode partition to the catholyte compartment to form alkaline peroxide in the catholyte compartment.

13. The method of claim 12 further comprising the step of passing oxygen from a gas plenum to the catholyte compartment through a gas diffusion cathode.

14. The method of claim 13 further comprising the step of providing the chlorine and alkaline peroxide from the electrolytic cell to a chemical laser.

* * * * *